United States Patent
Dittmar et al.

(10) Patent No.: US 7,251,942 B2
(45) Date of Patent: Aug. 7, 2007

(54) INTEGRATED GEARLESS AND NONLUBRICATED AUXILIARY POWER UNIT

(75) Inventors: Kevin S. Dittmar, Phoenix, AZ (US); David H. Edmonds, Tempe, AZ (US); Bjoern Schenk, Phoenix, AZ (US); Yogendra Y. Sheoran, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/880,820

(22) Filed: Jun. 29, 2004

(65) Prior Publication Data

US 2005/0284150 A1 Dec. 29, 2005

(51) Int. Cl.
F02C 7/06 (2006.01)
F02C 7/18 (2006.01)
F02C 7/275 (2006.01)

(52) U.S. Cl. ............................ 60/788; 60/785; 60/728; 60/39.83

(58) Field of Classification Search .................. 60/786, 60/787, 785, 802, 806, 39.83, 803, 728
See application file for complete search history.

(56) References Cited

U.S. PATENT DOCUMENTS

| | | | |
|---|---|---|---|
| 2,709,893 A * | 6/1955 | Birmann | 60/39.511 |
| 2,850,876 A | 9/1958 | Wood | |
| 2,908,189 A * | 10/1959 | Parker et al. | 60/788 |
| 3,214,908 A * | 11/1965 | Jones et al. | 60/796 |
| 4,151,709 A * | 5/1979 | Melconian et al. | 60/804 |
| 4,370,560 A | 1/1983 | Faulkner et al. | |
| 4,494,372 A | 1/1985 | Cronin | |
| 4,514,976 A | 5/1985 | Christoff | |
| 4,706,908 A | 11/1987 | Huffman et al. | |
| 4,916,893 A | 4/1990 | Rodgers | |
| 5,087,176 A * | 2/1992 | Wieland | 415/177 |
| 5,363,641 A | 11/1994 | Dixon et al. | |
| 5,442,905 A | 8/1995 | Claeys et al. | |
| 5,490,645 A | 2/1996 | Woodhouse | |
| 5,497,615 A | 3/1996 | Noe et al. | |
| 5,555,722 A | 9/1996 | Mehr-Ayin et al. | |
| 5,813,630 A | 9/1998 | Williams | |
| 5,899,085 A | 5/1999 | Williams | |
| 6,037,687 A | 3/2000 | Stewart et al. | |
| 6,101,806 A | 8/2000 | Chen et al. | |
| 6,152,978 A * | 11/2000 | Lundquist | 55/385.1 |
| 6,294,842 B1 * | 9/2001 | Skowronski | 60/776 |
| 6,305,156 B1 | 10/2001 | Lui | |
| 6,735,953 B1 * | 5/2004 | Wolfe et al. | 60/785 |
| 6,966,191 B2 * | 11/2005 | Fukutani et al. | 60/785 |
| 2002/0079760 A1 * | 6/2002 | Vessa | 310/75 D |

FOREIGN PATENT DOCUMENTS

| | | |
|---|---|---|
| EP | 0 812 996 A2 | 12/1997 |
| GB | 786 439 A | 11/1957 |
| GB | 839 961 A | 6/1960 |
| WO | 05254052.3-2315 | 10/2005 |

OTHER PUBLICATIONS

European Search Report.

* cited by examiner

*Primary Examiner*—Ted Kim
(74) *Attorney, Agent, or Firm*—Ingrassia Fisher & Lorenz

(57) ABSTRACT

An auxiliary power unit (APU) includes a compressor, a turbine, a combustor, and a starter-generator unit all integrated within a single containment housing. The turbine has an output shaft on which the compressor is mounted, and the starter-generator unit is coupled to the turbine output shaft without any intervening gears. The rotating components are all rotationally supported within the containment housing using bearings that do not receive a flow of lubricating fluid.

35 Claims, 13 Drawing Sheets

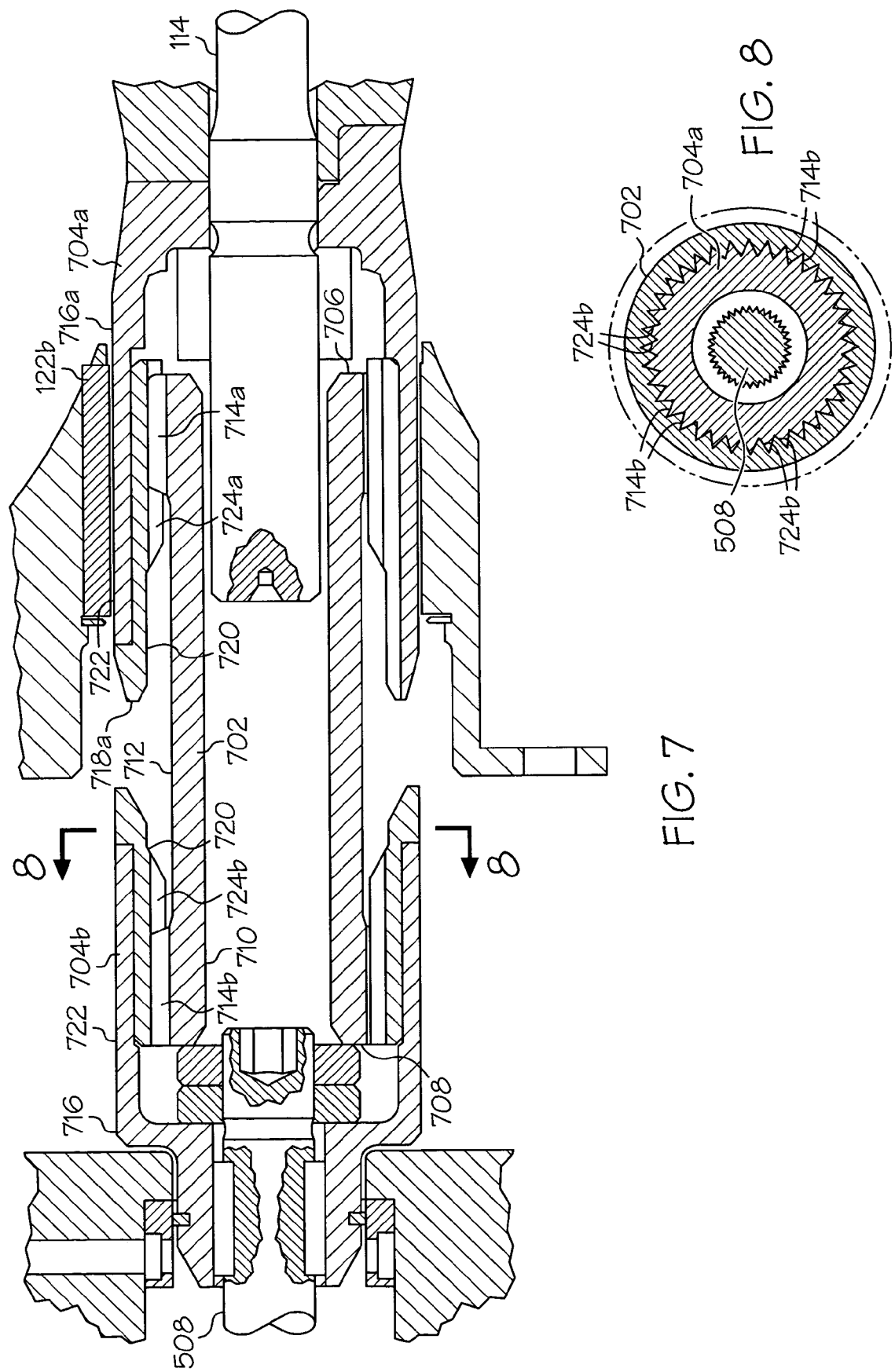

INTEGRATED GEARLESS AND NONLUBRICATED AUXILIARY POWER UNIT

TECHNICAL FIELD

The present invention relates to gas turbine engines and, more particularly, a gas turbine engine auxiliary power unit that is non-lubricated and includes integrated electrical power and electronics.

BACKGROUND

Aircraft main engines not only provide propulsion for the aircraft, but in many instances may also be used to drive various other rotating components such as, for example, generators, compressors, and pumps, to thereby supply electrical, pneumatic, and/or hydraulic power. However, when an aircraft is on the ground, its main engines may not be operating. Moreover, in some instances the main engines may not be capable of supplying power. Thus, many aircraft include one or more auxiliary power units (APUs) to supplement the main propulsion engines in providing electrical and/or pneumatic power. An APU may additionally be used to start the main propulsion engines.

An APU is, in most instances, a gas turbine engine that includes a combustor, a power turbine, and a compressor. During operation of the APU, compressor draws in ambient air, compresses it, and supplies compressed air to the combustor. The combustor receives fuel from a fuel source and the compressed air from the compressor, and supplies high energy compressed air to the power turbine, causing it to rotate. The power turbine includes a shaft that may be used to drive the compressor. In some instances, an APU may additionally include a starter-generator, which may either drive the turbine or be driven by the turbine, via the turbine output shaft. The starter-generator may be operated as either a motor or a generator. When operating as a motor, the starter-generator may be used to drive the turbine while the APU is being started, and when operating as a generator, it may be driven by the turbine and used to supply electrical power to the aircraft power distribution system.

In many instances, an APU may include some type of gearing between the turbine output shaft and the starter-generator. This can increase the overall size and weight of the APU. Some APUs have been proposed that do not include such gearing, and instead include a single shaft that interconnects a power turbine, a compressor, a cooling turbine, and a starter-generator. However, such APU configurations may also suffer certain drawbacks. For example, extensive design and high manufacturing tolerances may be needed to avoid unwanted shaft vibrations, which can increase overall costs. Moreover, such APUs have thus far been implemented using multi-stage compressors and/or turbines, which can increase the overall size, weight, and cost of the APU.

Many APUs may also include starter-generator control units that are disposed external to the APU, and thus occupy space within the aircraft fuselage. In addition, many APUs may include one or more components that rely on a flow of lubricant. Thus, the APU may be designed and implemented to include one or more interfaces to external lubrication systems, which can increase overall size, weight, and cost.

Hence, there is a need for an APU that can be implemented without the need for extensive design and/or high manufacturing tolerances, and/or without relatively bulky multi-stage compressors and/or actuators, and/or without external control units, and/or that does not rely on a flow of lubricant. The present invention addresses one or more of these needs.

BRIEF SUMMARY

The present invention provides an integrated APU that does not include gears between the turbine and other rotating components within the APU, and that does not receive a flow of lubricant.

In one embodiment, and by way of example only, and auxiliary power unit includes a combustor, a turbine, a compressor, starter-generator unit, and a quill shaft assembly. The turbine has an output shaft and is in fluid communication with at least a portion of the combustor. The compressor is coupled to the turbine output shaft. The starter-generator unit has at least a rotor. The quill shaft assembly is coupled between the turbine output shaft and the motor/generator rotor.

In another exemplary embodiment, an auxiliary power unit includes a compressor, a turbine, and one or more foil bearings. The compressor has an air inlet and a compressed air outlet. The foil bearings are coupled to, and are configured to rotationally support, the turbine, and are in fluid communication with the compressed air outlet, to thereby receive a flow of cooling air therefrom.

In yet another exemplary embodiment, an auxiliary power unit includes a containment housing, a compressor, a turbine, and one or more conduits. The compressor is mounted within the containment housing and includes at least an air inlet and a compressed air outlet. The turbine is rotationally supported within the containment housing, and has an output shaft. The conduits are disposed within the containment housing upstream of the compressor air inlet, and surround at least the turbine output shaft. The one or more conduits have at least an air inlet port in fluid communication with the compressed air outlet, whereby heat is exchanged between air that flows into the compressor air inlet and air that flows in the one or more conduits.

In yet still a further exemplary embodiment, an auxiliary power unit includes a containment housing, a turbine, a starter-generator housing, a motor/generator, and a control unit. The containment housing includes at least an inlet section and an outlet section. The turbine is rotationally supported within the containment housing outlet section, and has at least an output shaft. The starter-generator housing is disposed within the containment housing inlet section. The motor/generator is rotationally supported within the starter-generator housing, and has at least a rotor that is coupled to the turbine output shaft. The motor/generator is configured to selectively operate in either a motor mode, whereby electrical energy is converted to rotational energy and supplied to the turbine output shaft, or a generator mode, whereby rotational energy is received from the turbine output shaft and converted to electrical energy. The control unit is mounted within the starter-generator housing. The control unit is electrically coupled to the motor/generator and is operable to selectively configure the motor/generator to operate in either the motor mode or the generator mode.

Other independent features and advantages of the preferred auxiliary power unit will become apparent from the following detailed description, taken in conjunction with the accompanying drawings which illustrate, by way of example, the principles of the invention.

BRIEF DESCRIPTION OF THE DRAWINGS

FIG. 7 is a cross section view of an exemplary quill shaft assembly that may be used in the APU of FIGS. 1 and 2;

FIG. 8 is a cross section view of the exemplary quill shaft assembly of FIG. 7, taken along lines 8—8 therein;

DETAILED DESCRIPTION OF A PREFERRED EMBODIMENT

Before proceeding with a detailed description, it is to be appreciated that the described embodiment is not limited to use in conjunction with a particular type of turbine engine. Thus, although the present embodiment is, for convenience of explanation, depicted and described as being implemented as an auxiliary power unit, it will be appreciated that it can be implemented as various other types of devices, and in various other systems and environments.

Figure 1:
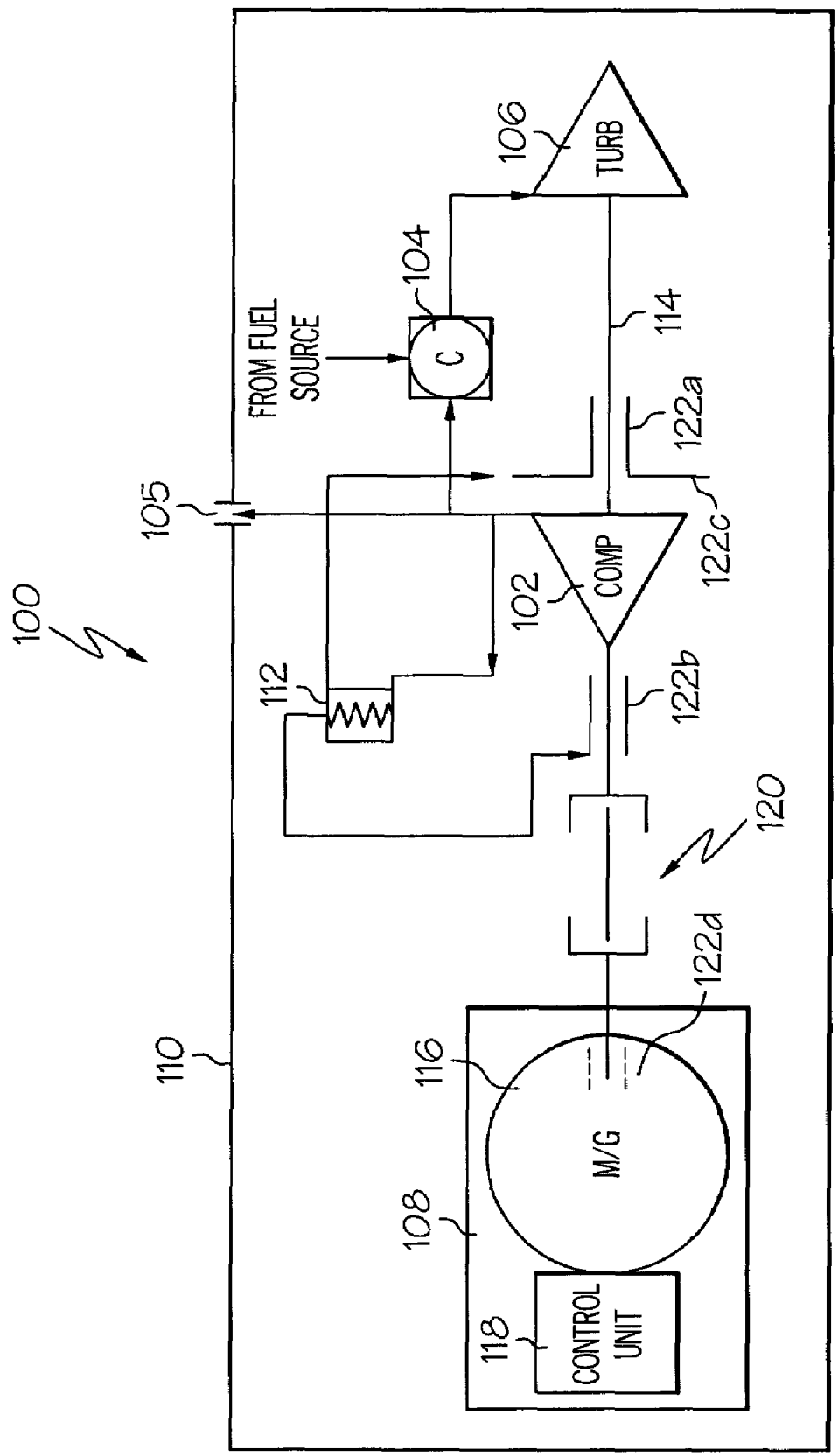
FIG. 1 is a schematic representation of an integrated auxiliary power unit (APU) according to an exemplary embodiment of the present invention.

Turning now to the description, and with reference first to FIG. 1, an embodiment of an exemplary auxiliary power unit (APU) 100 is shown in simplified schematic form. The APU 100 includes a compressor 102, a combustor 104, a turbine 106, and a starter-generator unit 108, all preferably housed within a single containment housing 110. During operation of the APU 100, the compressor 102 draws ambient air into the containment housing 110. As will be described more fully below, in a particular preferred embodiment, the ambient air drawn into the containment housing 110 is also used for cooling within the containment housing 110. The compressor 102 compresses the ambient air, and supplies a portion of the compressed air to the combustor 104, and may also supply compressed air to a bleed air port 105. The bleed air port 105, if included, is used to supply compressed air to a non-illustrated environmental control system. In the depicted embodiment, a portion of the compressed air is also supplied to a heat exchanger 112. The purpose for this is described in more detail further below. It will be appreciated that the compressor 102 may be any one of numerous types of compressors now known or developed in the future. In a particular preferred embodiment, however, the compressor is a single-stage radial impeller compressor.

The combustor 104 receives the compressed air from the compressor 102, and also receives a flow of fuel from a non-illustrated fuel source. The fuel and compressed air are mixed within the combustor 104, and are ignited to produce relatively high-energy combustion gas. The combustor 104 may be implemented as any one of numerous types combustors now known or developed in the future. Non-limiting examples of presently known combustors include various can-type combustors, various reverse-flow combustors, various through-flow combustors, and various slinger combustors.

No matter the particular combustor configuration 104 used, the relatively high-energy combustion gas that is generated in the combustor 104 is supplied to the turbine 106. As the high-energy combustion gas expands through the turbine 106, it impinges on the turbine blades (not shown in FIG. 1), which causes the turbine 106 to rotate. It will be appreciated that the turbine 106 may be implemented using any one of numerous types of turbines now known or developed in the future including, for example, a vaned radial turbine, a vaneless radial turbine, and a vaned axial turbine. In a particular preferred configuration, several embodiments of which are described further below, the turbine 106 is implemented as a vaneless radial turbine. No matter the particular type of turbine that is used, the turbine 106 includes an output shaft 114 that drives the compressor 102. Moreover, as will now be discussed, depending on the mode in which the APU 100 is operating, the turbine 106, via the output shaft 114, may also drive the starter-generator unit 108, or alternatively the turbine 106 may be driven by the starter-generator unit 108.

The starter-generator unit 108 includes a motor/generator 116 and an integral control unit 118. The motor/generator 116 is configured to be selectively operated in either a motor mode or a generator mode. In the motor mode, the motor/generator 116 receives electrical power from a non-illustrated electrical power source, which causes the motor/generator 116 to rotate and supply mechanical output power to, for example, the turbine 106 and compressor 102. In the generator mode, the motor/generator 116 receives mechanical input power from, for example, the turbine 106 and electrical power from the non-illustrated electrical power source. In response, the motor/generator 116 rotates, and generates electrical power, which is supplied to, for example, the aircraft.

It will thus be appreciated that the starter-generator unit 108, when operating in the motor mode, may be used to start the APU 100 and, when operating in the generator mode, may be used to supply electrical power. It will additionally be appreciated that the motor/generator 116 may be physically configured to implement a radial gap type motor/generator or an axial gap type motor/generator. In addition to the various types of physical configurations, it will be further appreciated that the motor/generator 116 may be configured to implement any one of numerous types of motor/generators including, for example, permanent magnet, induction, and switched reluctance type motor/generators.

The integral control unit 118 is electrically coupled to the motor/generator 116 and controls and regulates the motor/generator 116. In particular, the control unit 118, based on input signals from one or more non-illustrated sensors or other externals systems and/or devices, selectively switches the operational mode of motor/generator 116 between the motor mode and the generator mode. The control unit 118 also regulates the mechanical and electrical power output of the motor/generator 116 in the motor mode and generator mode, respectively. It will be appreciated that the integral control unit 118 may implement any one of numerous known motor and generator control laws, and may be physically implemented using any one of numerous known circuit configurations for implementing the respective control laws.

It was noted above that the turbine 106, via the output shaft 114, may either drive, or be driven by, the starter-generator unit 108. In the depicted embodiment this is accomplished by coupling the turbine output shaft 114 to the starter-generator unit 108 via a quill shaft assembly 120. It will be appreciated that the quill shaft assembly 120 may be implemented using any one of numerous types of configurations, and numerous and varied types of materials. A particular preferred embodiment of the quill shaft assembly 120 will be described in more detail further below.

As FIG. 1 additionally shows, the turbine output shaft 114 is rotationally mounted within the containment housing 110 via a set of non-lubricated bearings 122, which include, for example, journal bearings 122a and 122b, and a thrust bearing 122c. Although the bearings 122 could be implemented using any one of numerous known non-lubricated bearing configurations, in a particular preferred embodiment, the bearings 122 are foil bearings. Foil bearings, as is generally known, operate in a non-contact manner by generating a thin layer of high-pressure air between the shaft 114 and the bearings 122. As shown in phantom FIG. 1, the motor/generator 116 could also be rotationally supported by one or more foil bearings 122d.

As was also previously noted, a portion of the compressed air supplied by the compressor 102 is, at least in the depicted embodiment, also supplied to the heat exchanger 112. The heat exchanger 112, if included in the APU 100, cools the compressed air that is supplied as cooling air to the foil bearings 122. It will be appreciated that the compressed air from the compressor 102 may be cooled in the heat exchanger 112 by any one of numerous types of fluid cooling media. In a particular preferred embodiment, however, the intake air that flows into and through the containment housing 110, and into the compressor 102, is used as the cooling medium. It will additionally be appreciated that the intake air may also be used to cool the foil bearings 122 in addition to, or instead of, the cool compressed air discharged from the heat exchanger 112. As yet another alternative, a portion the compressed air discharged from the compressor 102 could, in addition to or instead of the cool compressed air discharged from the heat exchanger 112, be supplied to the foil bearings 122 without first being cooled in the heat exchanger 112. If only non-cooled compressor discharge air is used, it will be appreciated that the APU 100 be implemented without the heat exchanger 112. It will be further appreciated that the heat exchanger 112, if included, may be physically implemented using any one of numerous heat exchanger configurations now known or developed in the future. A particular preferred physical implementation will be described in more detail further below.

Having generally described the arrangement and function of the preferred APU 100, while noting that it could be implemented in any one of numerous physical configurations, descriptions of various preferred physical configurations will now be described. In doing so, reference should be made to FIGS. 2–8, which depict the various preferred physical configurations, and in which like reference numerals refer to like parts shown in FIG. 1 and described above.

Figure 2:
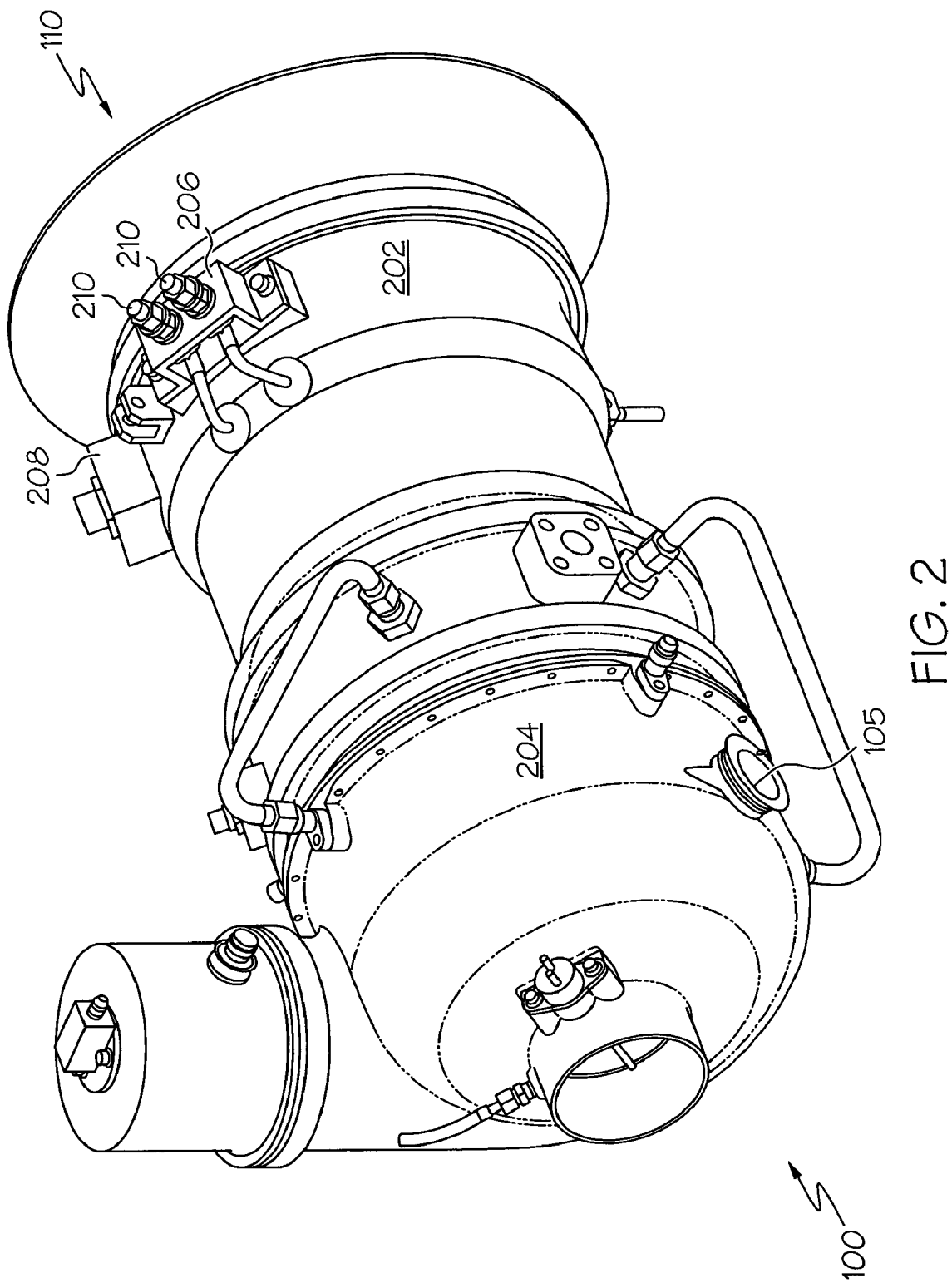
FIG. 2 is a perspective view of a physical implementation of the APU of FIG. 1, according to a first embodiment.

Turning first to FIG. 2, one exemplary physical embodiment of the APU 100 is shown. In the depicted embodiment, the containment housing 110 includes an inlet section 202 and an outlet section 204 that are coupled to one another via a plurality of fasteners (not shown in FIG. 2). As is shown more clearly in FIG. 3, in which the containment housing 100 is shown in phantom, the inlet section 202 includes an inlet port 302, and houses the starter-generator unit 108, and the heat exchanger 112. Similarly, as FIG. 4 clearly shows by also depicting the containment housing 110 in phantom, the outlet section 204 includes an exhaust port 402, and houses the compressor 102, the combustor 104, and the turbine 106. It will be appreciated that although the containment housing 110 is, at least in the depicted embodiment, configured as a two-section structure, it could also be configured as a unitary structure, or as a multi-section structure of more than two sections.

Returning once again to FIG. 2, it is seen that the depicted containment housing 110 additionally includes the previously-mentioned bleed air port 105, a terminal block 206, and a connector assembly 208. The bleed air port 105, at least in the depicted embodiment, extends through the outlet section 204 and, as was noted above, is used to supply a portion of the compressed air supplied by the compressor 102 to a non-illustrated environmental control system. The terminal block 206, which in the depicted embodiment is mounted on the inlet section 202, includes a plurality of electrical contacts 210 that are used to electrically couple the APU 100 to, for example, an aircraft electrical power distribution system (not shown). The connector assembly 208, which in the depicted embodiment is also mounted on the inlet section 202, electrically couples the APU 100 to, for example, an aircraft communication bus (not shown), to provide communication between the integral control unit 118 and one or more external systems such as, for example, an engine controller and/or an avionics system (neither of which are shown).

Figure 3:
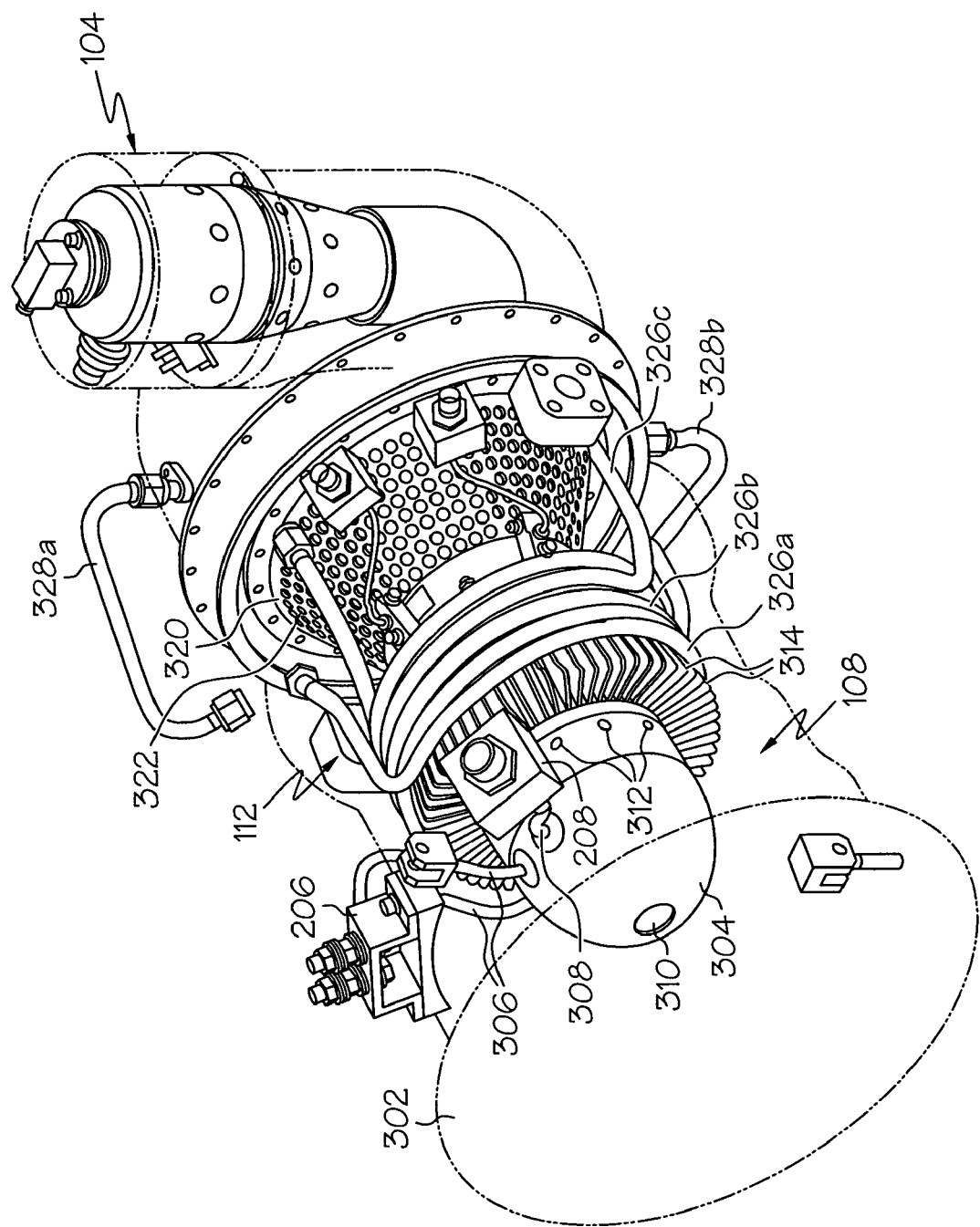
FIGS. 3 and 4 are perspective views of the exemplary APU shown in FIG. 2 with the housing shown in phantom.
Figure 5:
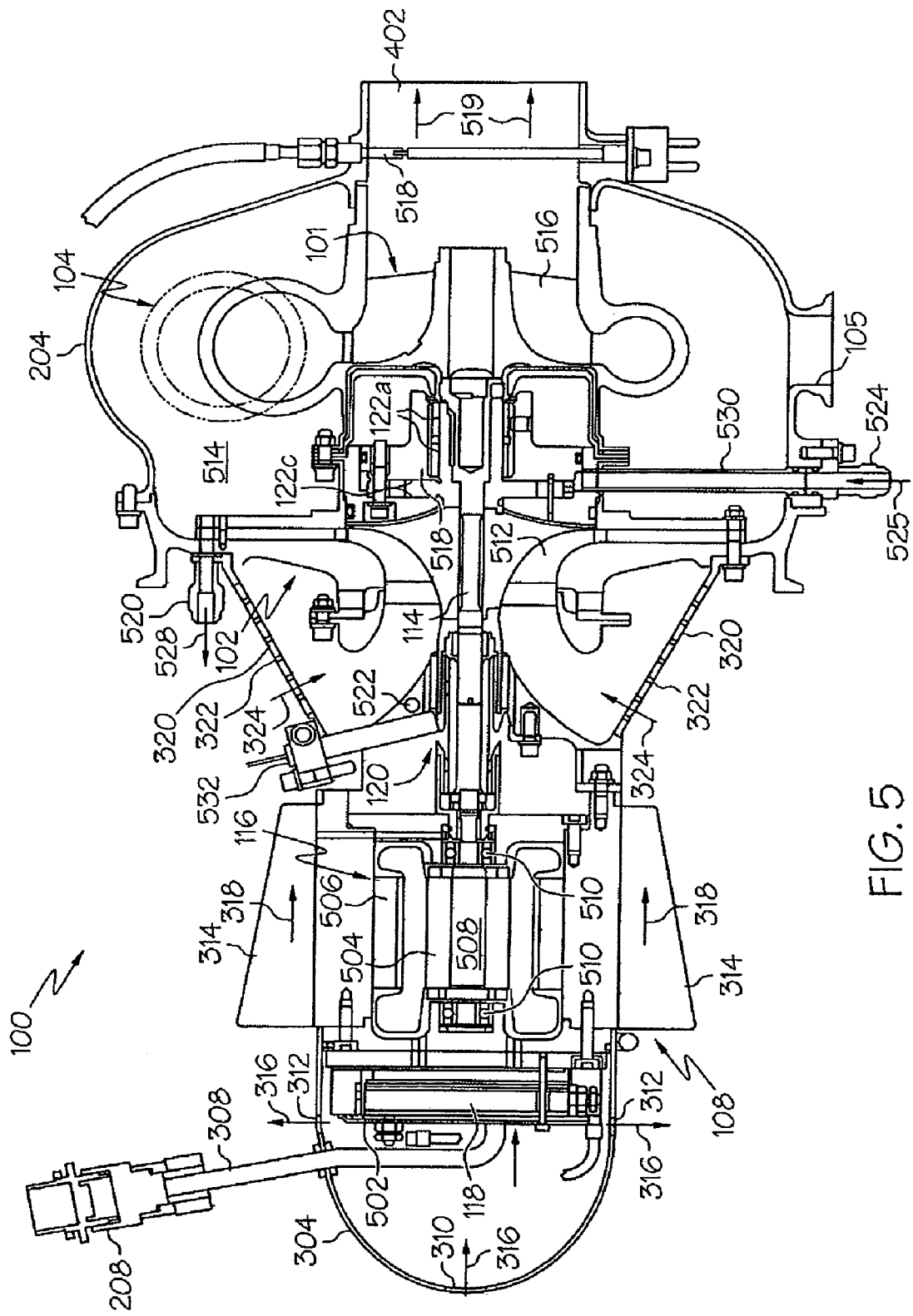
FIG. 5 is a cross section view of the exemplary APU shown in FIG. 2.

With reference now to FIGS. 3 and 5 together, the starter-generator unit 108 is shown to be mounted within a starter-generator housing 304, and electrically coupled to both the terminal block 206 and the connector assembly 208 via a pair of high-power electrical cables 306 and a connector cable 308, respectively. The starter-generator housing 304 includes an air inlet port 310, a plurality of air outlet ports 312, and a plurality of cooling fins 314. A portion of the air that enters the containment housing inlet port 302 flows into the starter-generator housing air inlet port 310, and exits the starter-generator housing air outlet ports 312, to provide cooling for the integral control unit 118. In particular, and as shown most clearly in FIG. 5, it is seen that the integral control unit 118 is mounted in an electronics housing 502 that is disposed within the starter-generator housing 304. Air that enters the starter-generator housing inlet port 310, depicted using flow arrows 316, flows past the electronics housing 502 and out the starter-generator housing outlet ports 312, thereby providing forced convection cooling of the integral control unit 118.

The cooling fins 314 also provide cooling of the starter-generator unit 108. The cooling fins 314 extend from the motor/generator 116 and, in combination with a flow of air 318 past the cooling fins 314, transfer heat away from the motor/generator 116. In particular, and as shown most clearly in FIG. 5, the motor/generator 116 includes a rotor 504 and a stator 506, and is configured, at least in the depicted embodiment, in a radial gap arrangement. The rotor 504 is mounted on a shaft 508, which is rotationally supported in the starter-generator housing 304 by a pair of bearing assemblies 510. The bearing assemblies 510 may be any one of numerous types of bearing assemblies, but in the depicted embodiment are ceramic, grease packed roller bearing assemblies. It will be appreciated, as was previously noted, that one or more of the bearing assemblies 510 could instead be a foil bearing assembly 122d. The cooling fins 314 are coupled to, and extend from, the stator 506. Thus, the air 318 that flows past the cooling fins 314 assists in transferring heat from the cooling fins 314, and thus the motor/generator 116. As FIG. 5 additionally shows, the cooling fins 314 are also thermally coupled to, and thus provide cooling for, the bearing assemblies 510.

With continued reference to FIGS. 3 and 5, it is seen that a perforated screen 320 is coupled between the starter-generator housing 304 and the compressor 102. A plurality of openings 322 are formed through the screen 320. Thus, air that is drawn into the compressor 102, represented by arrows 324 (see FIG. 5), passes through the openings 322 in the perforated screen 320, thereby providing some filtration of the compressor inlet air.

Figure 4:
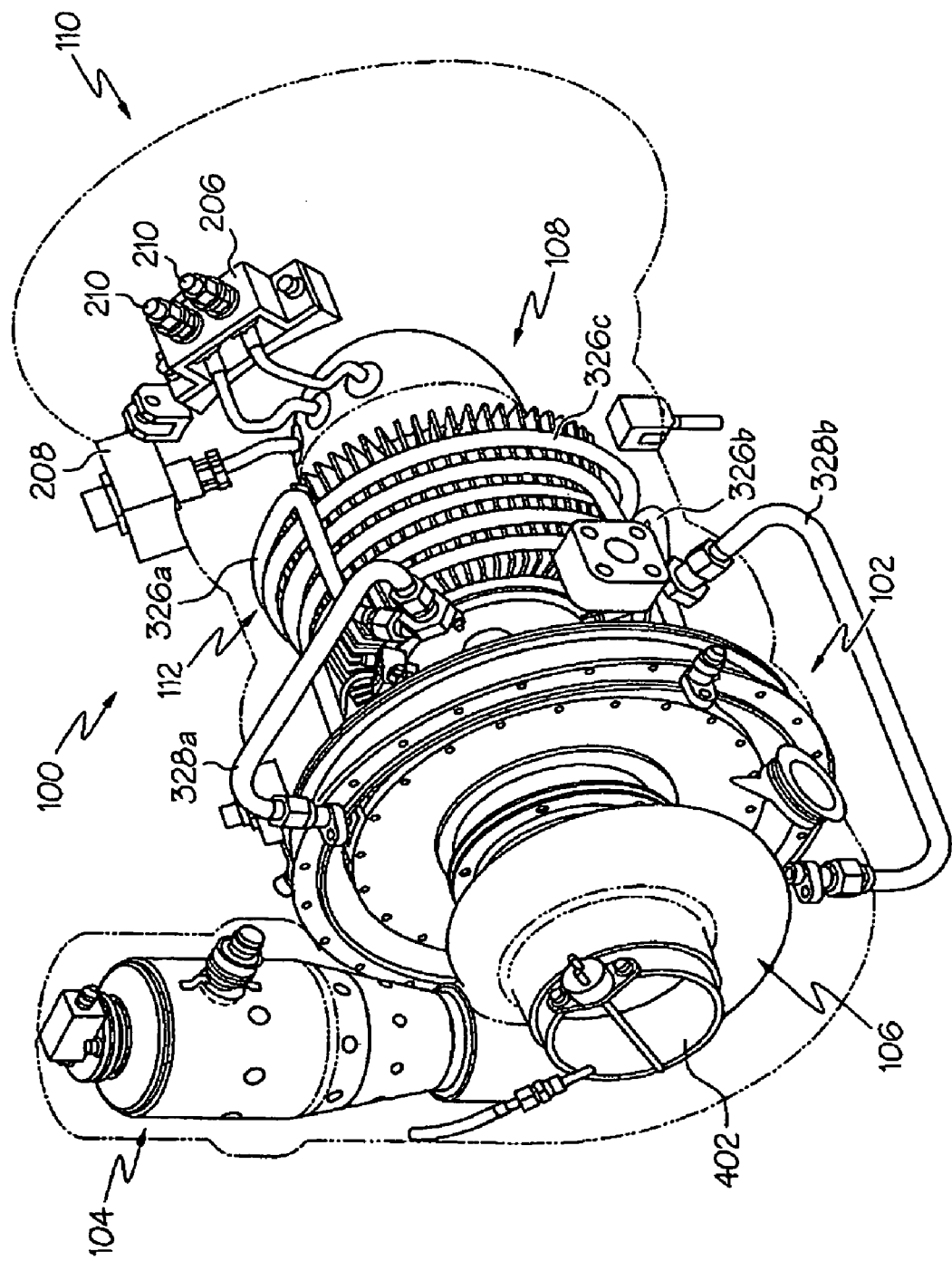

Turning now to FIGS. 4 and 5 in combination, the compressor 102, the combustor 104, and turbine 106 are shown to be mounted in the containment housing outlet section 204. The compressor 102, as shown most clearly in FIG. 5, includes an impeller 512 and, as was noted above, is mounted on the turbine output shaft 114. Thus, when the turbine output shaft 114 rotates, the compressor 102 is rotated. When rotating, the compressor 102 draws ambient air into the containment housing inlet port 302. A portion of the air flows into and through the starter-generator housing 304, as described above. The remaining portion of the air flows past the starter-generator unit 108, through the openings 322 in the perforated screen 320, and into the compressor 102, where it is compressed. The compressed air is then discharged from the compressor 102 into a compressed air plenum 514 formed in the containment housing outlet section 204, where it is supplied to the combustor 104, the turbine 106, and the bleed air port 105. As was previously noted, a portion of the compressed air discharged from the compressor 102 is also supplied to the heat exchanger 112. A physical embodiment of the heat exchanger 112, and how the compressed air is supplied to and through the heat exchanger 112, is described in more detail further below. Before doings so, however, embodiments of the combustor 104 and turbine 106 that are used in the present APU 100 embodiment will be described in more detail, beginning with the combustor 104.

Figure 6:
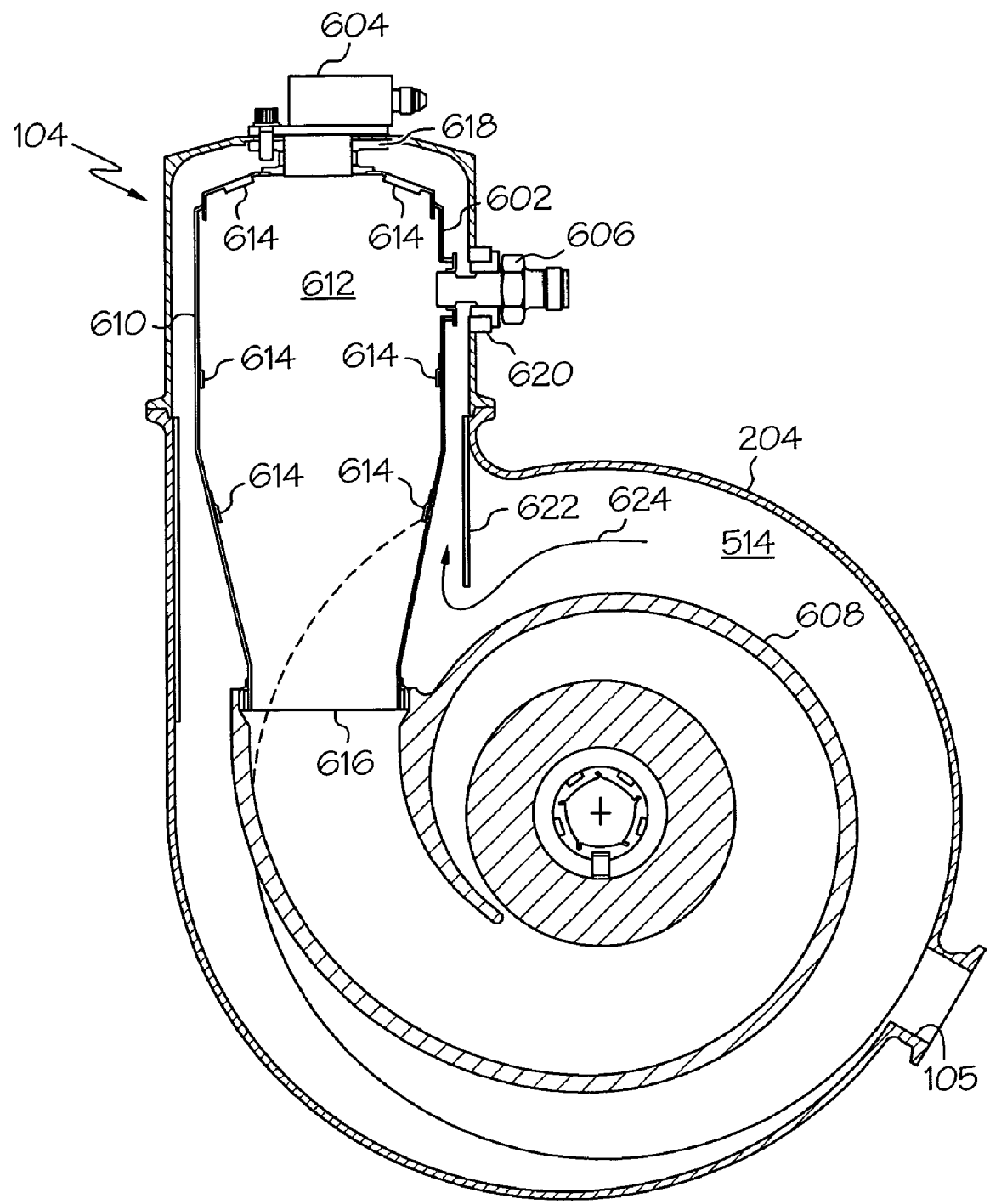
FIG. 6 is a cross section view of an exemplary combustor that is used in the exemplary APU of FIG. 2.

In the depicted embodiment, the combustor 104 is implemented as a can type combustor. A physical implementation of the combustor 104 is shown in FIG. 6, and with reference thereto will now be described in more detail. The combustor 104 includes a combustor dome 602, a fuel injector 604, an igniter 606, and a scroll 608. The combustor dome 602, as was noted above, is mounted in the containment housing outlet section 204 and includes an outer wall 610 that defines a combustion chamber 612, a plurality of air inlets 614, a combustion gas outlet 616, a fuel injector mount 618, and an igniter mount 620. The air inlets 614 are disposed around the sides of the combustor dome 602, as well as in one of its ends. The air inlets 614 extend through the outer wall 610 and fluidly communicate the compressed air plenum 514 with the combustion chamber 612.

In the depicted embodiment, a baffle plate 622 extends from the containment housing outlet section 204 and into the compressed air plenum 514. Thus, as illustrated by flow arrow 624, a portion of the compressed air discharged into the compressed air plenum 514 first flows past the baffle plate 622, and then through the combustor air inlets 614 and into the combustion chamber 612. This circuitous flow path prevents the compressed air in the compressed air plenum 514 from directly impinging on the relatively hotter combustor dome outer wall 610. The baffle plate 622 also creates eddy currents in the compressed air, thereby better diffusing the compressed air about the combustor dome outer wall 610, and providing a more even flow of air around the combustor dome 602. As a result, variations in the quantity of compressed air flowing through each of the air inlets 614 and into the combustion chamber 612 are reduced.

The compressed air in the combustion chamber 612, as was previously noted, is mixed with fuel and is combusted, thereby generating high-energy combustion gas. The high-energy combustion gas exits the combustor dome 602 via the combustion gas outlet 616, and is directed into the power turbine 140 via the scroll 608. Though not depicted, for clarity sake, it will be appreciated that multiple cooling holes may be formed partially or completely through the combustor dome 602, to provide effusion cooling for the combustor 104.

The fuel injector 604 is coupled to the fuel injector mount 618 and is adapted to receive fuel from a non-illustrated fuel source. The fuel injector 604 is also adapted to receive commands from a non-illustrated controller and is operable, in response to these commands, to inject the fuel supplied to it into the combustion chamber 612. The igniter 606 is mounted in the igniter mount 620, and extends into the combustion chamber 612. The igniter 606 is also coupled to receive commands from the non-illustrated controller and is operable, in response to these commands, to generate one or more sparks. The sparks in turn ignite the fuel/air mixture in the combustion chamber 612 to generate the high-energy combustion gas that is supplied to the turbine 106, an embodiment of which will now be described.

Returning once again to FIG. 5, the turbine 106 includes a plurality of blades 516 that are coupled to, and extend radially away from, the turbine output shaft 114. As was previously noted, and as is shown in FIG. 5, the turbine 106 is preferably a vaneless radial turbine; however, it will be appreciated that a vaned radial, mixed-flow, or axial turbine could also be used. No matter the particular type of turbine 106 that is used, the turbine 106 receives a portion of the compressed air discharged from the compressor 102, and the high-energy combustion gas that is discharged from the combustion chamber 612 into the scroll 608. The compressed air and combustion gas impinge on the turbine blades 516, which extracts energy from impinging the air and gas and causes the turbine 106 to rotate. The reduced energy air and gas 519 are then exhausted from the turbine 106 and exit the APU 100 via the exhaust port 402. A temperature sensor 518 is disposed in the exhaust port 402, and is used to measure exhaust temperature.

The turbine output shaft 114, as was noted above, is rotationally mounted within the containment housing 110 via the foil journal bearing 122a and the foil thrust bearing 122c. In the depicted embodiment, the foil journal bearing 122a is coupled to a sealed bearing support 518. The foil bearings 122 are preferably air cooled using a portion of the compressed air that is discharged from the compressor 102. In the depicted embodiment, the compressed air used to cool the foil bearings 122 is first cooled in the heat exchanger 112, a particular preferred embodiment of which will now be described.

As shown most clearly in FIGS. 3 and 4, the heat exchanger 112 is implemented using a plurality of conduits 326 that surround the cooling fins 314. In the depicted embodiment, the heat exchanger 112 includes three conduits 326a, 326b, and 326c. Each conduit 326 is coupled to a separate heat exchanger supply nozzle 520 (see FIG. 5). For clarity and ease of illustration, the heat exchanger supply nozzles 520 are not depicted in FIGS. 3 and 4, and only one heat exchanger supply nozzle 520 is shown in FIG. 5.

Nonetheless, it will be appreciated that the APU 100 preferably includes three evenly spaced heat exchanger supply nozzles 520. In addition to being coupled to a heat exchanger supply nozzle 520, two of the heat exchanger conduits 326a, 326b are also coupled, one each, to a turbine bearing supply conduit 328a, 328b, and one of the heat exchanger conduits 326c is coupled to a forward journal bearing supply nozzle 522 (see FIG. 5). The turbine bearing supply conduits 328a, 328b are in turn coupled, one each, to a turbine bearing supply nozzle 524 (see FIG. 5). As with the heat exchanger supply nozzles 520, only a single turbine bearing supply nozzle 524 is shown in FIG. 5, and are not shown at all in FIGS. 3 and 4.

The heat exchanger supply nozzles 520 are in fluid communication with the compressed air plenum 514, preferably in a relatively low energy section of the compressed air plenum 514 to minimize the flow of potential contaminants, such as dust particles, into the heat exchanger supply nozzles 520. As flow arrow 528 in FIG. 5 shows, a portion of the compressed air that is discharged from the compressor 102 into the compressed air plenum 514, flows into and through each heat exchanger supply nozzle 520, and into and through its associated heat exchanger conduit 326. As the compressed air flows through the heat exchanger conduits 326, it is cooled by compressor intake air that is flowing past the conduits 326 and into the compressor 102. The cooled compressed air in two of the heat exchanger conduits 326a, 326b flows into and through the turbine bearing supply conduits 328a, 328b, into and through the turbine bearing supply nozzles 524, as illustrated with flow arrow 525, into and through a turbine bearing supply tubes 530, and is directed onto the turbine foil bearing 122a, 122c. In a particular preferred embodiment, the turbine bearing supply tube 530 is also configured to function as a heat sink, to thereby provide further cooling of the APU 100. The cooled compressed air in the remaining heat exchanger conduit 326c flows into and through the forward journal bearing supply nozzle 522, and into a cavity where it is drawn through the second foil journal bearing 122b by the compressor 102.

As was previously mentioned, the quill shaft assembly 120 couples the turbine output shaft 114 to the starter-generator unit 108. More particularly, as is shown in FIG. 5, the quill shaft 120 couples the turbine output shaft 114 to the motor/generator shaft 508. Thus, the turbine 106 and motor/generator rotor 504 rotate at the same speed. A particular preferred embodiment of the quill shaft assembly 120 is shown in FIGS. 7 and 8, and will now be described in more detail.

The quill shaft assembly 120 includes a quill shaft 702 and a plurality of shaft couplings 704, and is rotationally supported via the second foil journal bearing 122b. The quill shaft 702 is preferably tubular in cross section, and has a first end 706, a second end 708, an inner surface 710, and an outer surface 712. A plurality of splines 714 are formed on at least a portion of the quill shaft outer surface 712. In the depicted embodiment, a first set of splines 714a is formed on the quill shaft outer surface 712 proximate the first end 706, and a second set of splines 714b is formed on the quill shaft outer surface 712 proximate second end 708. It will be appreciated that this is merely exemplary of a particular preferred embodiment, and that the splines 714 could extend along the entire quill shaft outer surface 712. The quill shaft 702 may be constructed of any one of numerous materials. However, the quill shaft 702 is preferably constructed of a material that will break down when it is subjected to a predetermined torque magnitude, while at the same time will properly function under temperatures that may reach about 450° F. In a particular preferred embodiment, the quill shaft 702 is constructed of a polyimide material sold under the trademark VESPEL owned by the Du Pont Corporation of Wilmington, Del. It will be appreciated, however, that various other suitable materials such as, for example, CP21 and CP25, could also be used.

The shaft couplings 704, which include a turbine shaft coupling 704a and a rotor shaft coupling 704b, are also preferably tubular in cross section. Each shaft coupling 704 includes a first end 716, a second end 718, an inner surface 720, and an outer surface 722. The turbine output shaft 114 is coupled to the turbine shaft coupling 704a proximate the first end 716a, and extends partially within the turbine shaft coupling 704a. Similarly, the rotor shaft 508 is coupled to the rotor shaft coupling 704b proximate the first end 716b, and extends partially within the rotor shaft coupling 704b. Each shaft coupling 704 includes a plurality of splines 724, which are formed on at least a portion of the shaft coupling inner surfaces 720. In the depicted embodiment, a first set of splines 724a is formed on the turbine shaft coupling inner surface 720a, and a second set of splines 724b is formed on the rotor shaft coupling inner surface 720b. As shown most clearly in FIG. 8, the splines 724 on the shaft couplings 704 engage the splines 714 on the quill shaft 702.

In addition to each of the components, devices, and subsystems described above, the APU 100 may also include additional components to improve and/or optimize APU performance. For example, a speed sensor 532 is mounted within the containment housing 110 proximate the quill shaft assembly 120, and is used to monitor the rotational speed of the quill shaft assembly 120. The speed sensor 532 may be any one of numerous known sensors such as, for example, a Hall effect sensor, an optical sensor, or an ECKO (eddy current kill oscillator) sensor. The speed sensor 532 is electrically coupled to the integral control unit 118, and supplies the integral control unit 118 with a speed signal representative of quill shaft rotational speed. The integral control unit 118 uses the speed signal to determine, for example, whether the operational mode of the motor/generator 116 should switched from the motor mode to the generator mode.

The embodiment described above and depicted in FIGS. 2–8 is merely exemplary of one particular embodiment. Indeed, as was previously noted when describing the general embodiment depicted in FIG. 1, the APU 100 could be implemented using, for example, various types of combustors 104, and/or without the heat exchanger 112. Two alternative embodiments of the APU 100, one of which includes a slinger combustor and no heat exchanger, and the other of which includes an inline annular combustor and no heat exchanger, are illustrated in FIGS. 9–15 and will now be described in detail. In doing so, it should be understood that like reference numerals in FIGS. 9–15 refer to like components in FIGS. 1–8, and that those components that do not differ in structure or function from the prior embodiments will not be further described.

Figure 9:
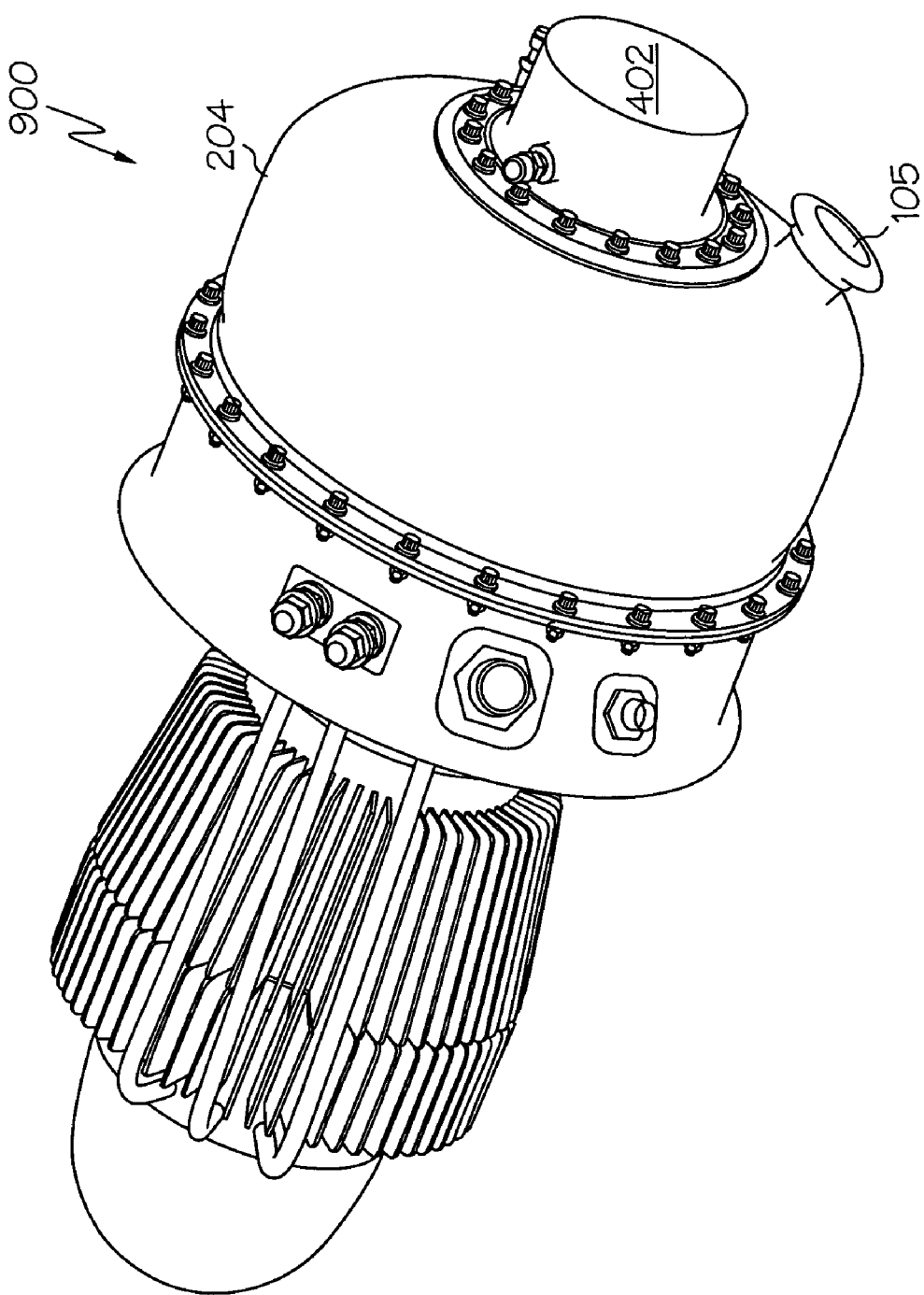
FIG. 9 is a perspective view of a physical implementation of the APU of FIG. 1, according to a second embodiment.
Figure 10:
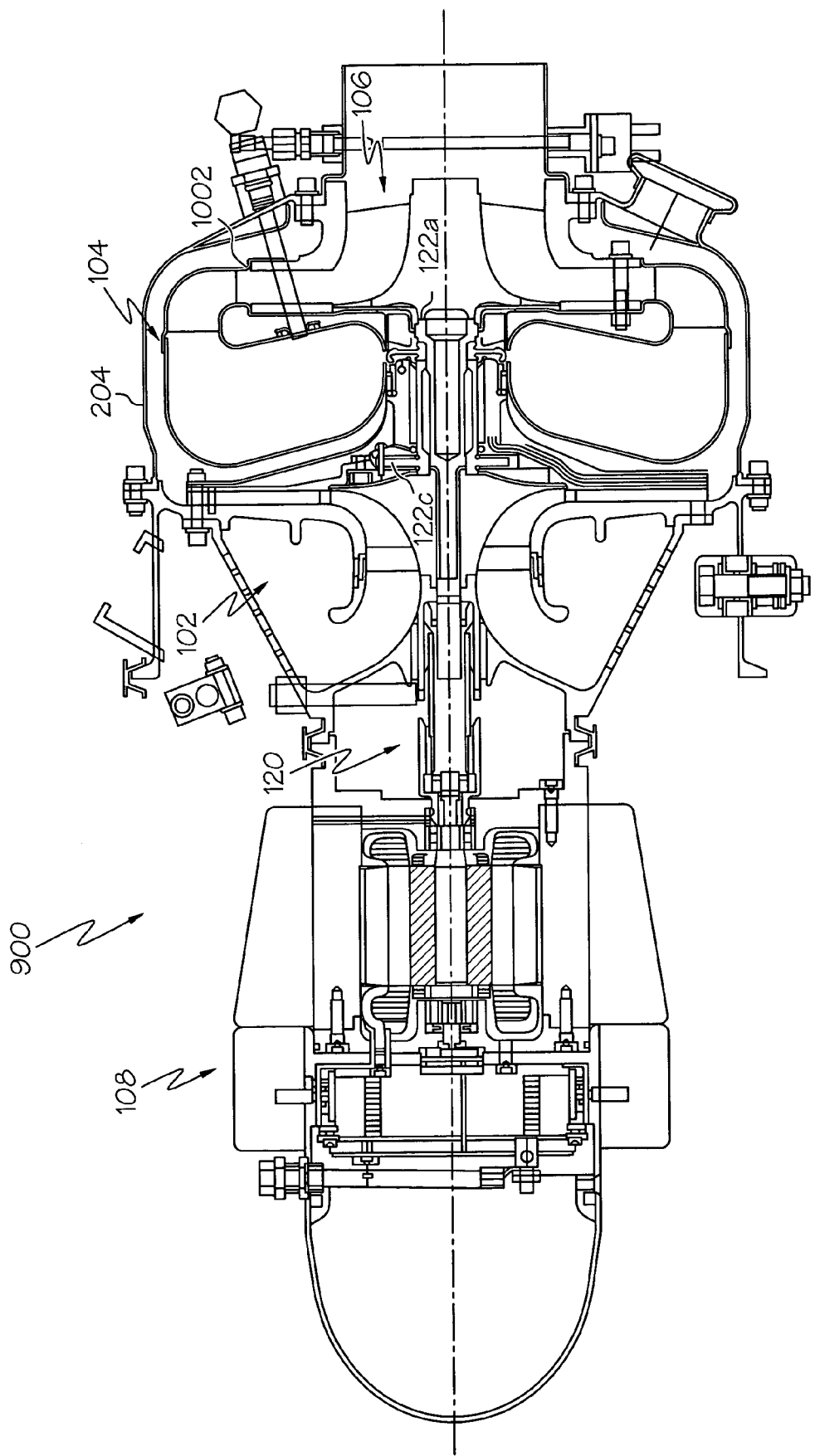
FIG. 10 is a cross section view of the exemplary APU shown in FIG. 9.

With the above background in mind, and with reference first to FIGS. 9 and 10, a second embodiment of an APU 900 is shown. The APU 900 in this second embodiment, includes the compressor 102, the turbine 106, the starter-generator unit 108, the containment housing 110 (only partially shown), the quill shaft assembly 120, and the foil bearings 122 described in the previous embodiments, as well as the variations of each that were described. As such, these components and the associated functions will not be further described. However, and is shown more clearly in FIG. 10, instead of the can-type combustor, the APU 900 in this second embodiment includes a slinger combustor 104. The APU 900 additionally includes no heat exchanger 112. Rather, the foil bearings 122 are cooled using compressed air that is discharged from the compressor 102 and is not cooled.

Figure 11:
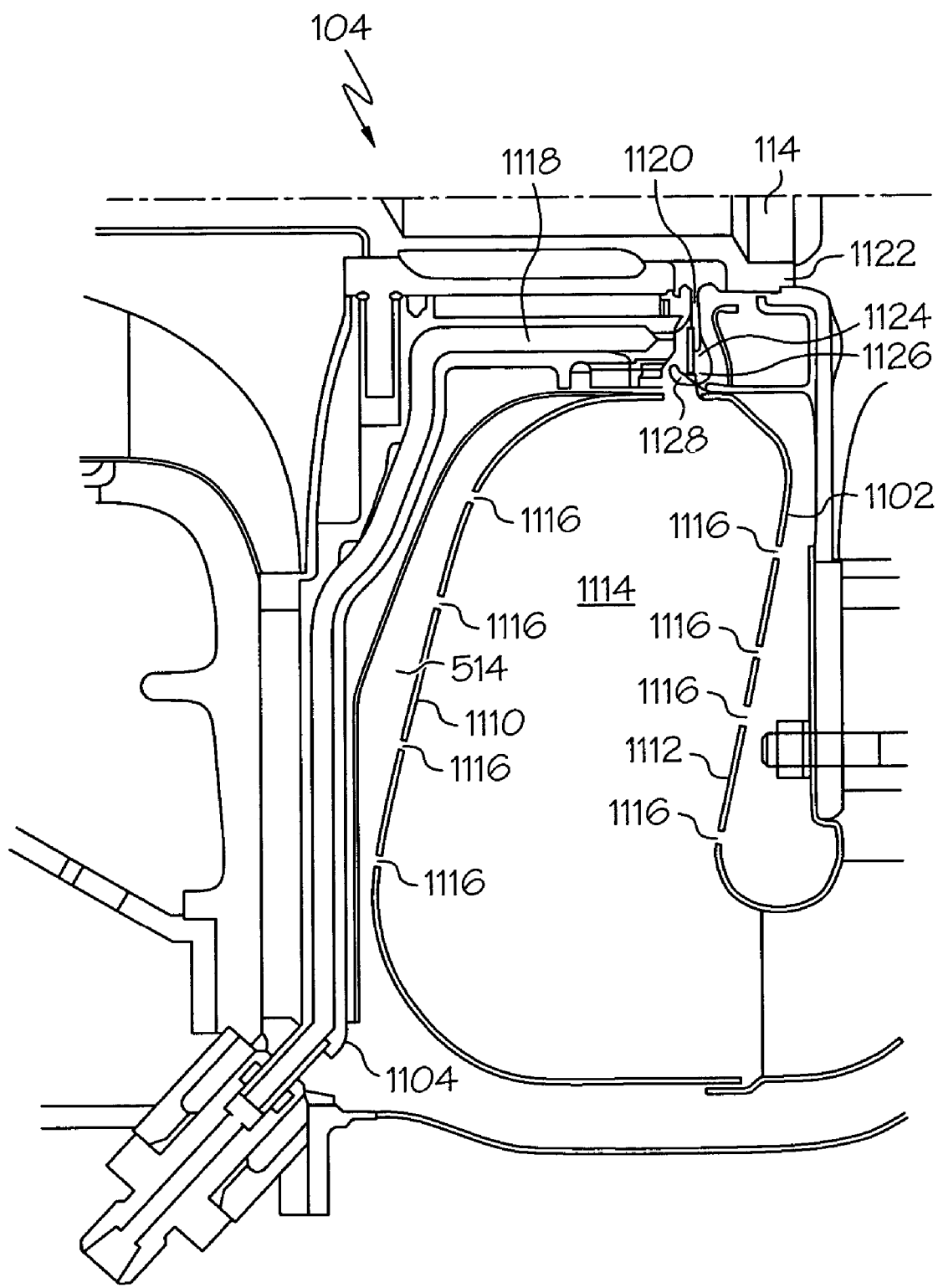
FIGS. 11 and 12 are close-up cross section views of a portion of the exemplary APU shown in FIG. 9.
Figure 12:
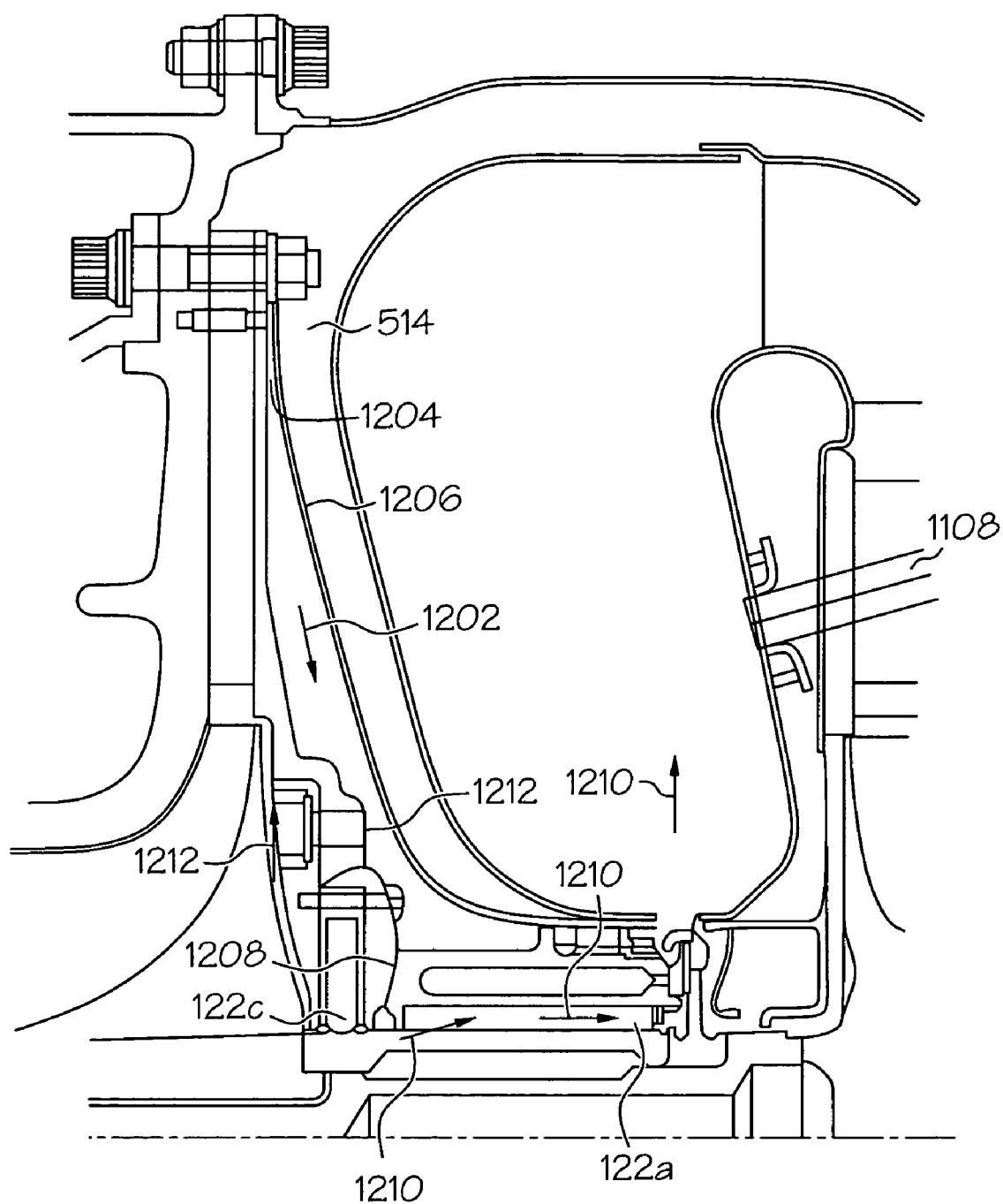

With reference now to FIGS. 11 and 12, it is seen that the slinger combustor 104 includes a radial-annular combustor 1102, a fuel supply tube 1104, a rotary fuel slinger 1106, and an igniter 1108 (see FIG. 12). The radial-annular combustor 1102 includes a forward annular liner 1110 and an aft annular liner 1112. The forward and aft annular liners 1110, 1112 are spaced apart from one another and form a combustion chamber 1114. The forward and aft annular liners 1110, 1112 each include a plurality of air inlet orifices 1116 (only some of which are shown), and a plurality of effusion cooling holes (not illustrated). Compressed air from the compressor 102 flows into the combustion chamber 1114 via the air inlet orifices 1116 in both the forward and aft annular liners 1110, 1112. It will be appreciated that compressed air also flows into the combustion chamber 1114 via the effusion cooling holes; however, the primary purpose of these holes is to provide effusion cooling to the liners 1110, 1112.

The fuel supply tube 1104, which is preferably a steel tube, extends into the compressed air plenum 514, and is adapted to receive a flow of fuel from a non-illustrated fuel source. The fuel supply tube 1104 is preferably routed through the plenum 514, and is preferably configured with sufficient flexibility, to allow for any thermal mismatches that may occur between other components and systems in the APU 900 during operation. The fuel supplied to the fuel supply tube 1104 passes through the tube 1104, and is directed into a fuel delivery annulus 1118. In the depicted embodiment, the fuel delivery annulus 1118 is configured as a circumferential cavity, though it will be appreciated that other configurations could also be used. The fuel delivery annulus 1118 includes a plurality of equally spaced holes 1120, through which the fuel is jetted to the rotary fuel slinger 1106.

The rotary fuel slinger 1106 includes a coupler shaft 1122, a vertical shoulder 1124, and a slinger 1126. The coupler shaft 1122 is coupled to the turbine shaft 114 and rotates therewith. The vertical shoulder 1124 is coupled to, and is preferably formed as an integral part of, the coupler shaft 1122 and thus rotates with the coupler shaft 1122. The fuel that is jetted through the holes 1120 in the fuel delivery annulus 1118 impinges onto the vertical shoulder 1124. Because the vertical shoulder 1124 rotates with the coupler shaft 1122, the impinging fuel acquires the tangential velocity of the coupler shaft 1122 and gets centrifuged into the slinger 1126.

The slinger 1126 is coupled to, and is preferably formed as an integral part of, the vertical shoulder 1124 and thus also rotates with the coupler shaft 1122. In the depicted embodiment, the slinger 1126 has a substantially cup-shaped radial cross section, and includes a plurality of relatively small, equally spaced holes or slots 1128. As the slinger 1126 rotates, fuel is centrifuged through these holes 1128, which atomizes the fuel into tiny droplets and evenly distributes the fuel into the combustion chamber 1114. The evenly distributed fuel droplets are readily evaporated and ignited in the combustion chamber 1114.

The high-energy combusted gas is supplied from the combustor 104 to the turbine 106 via a turbine inlet nozzle 1002. As FIG. 10 shows, the turbine inlet nozzle 1002 is configured to change the flow direction of the combusted gas from a radially outward flow direction to radially inward flow direction. It will be appreciated that in the depicted embodiment the turbine inlet nozzle 1002 is configured to include a plurality of hollow vanes to facilitate passage of the igniter 1008 through the turbine inlet nozzle 1002, and then through the aft annular liner 1112 and partially into the combustion chamber 1114.

The foil bearings 122 in the APU 900 are cooled using compressed air that is discharged from the compressor 102, and supplied to the foil bearings 122, without first cooling the air, via an internal cooling supply. With reference to FIG. 12, this internal cooling supply will now be described. As indicated using flow arrow 1202, a portion of the air discharged from the compressor 102 is directed into a cooling air supply plenum 1204 that is define, at least in part, by a heat shield 1206. The heat shield 1206 thermally isolates the cooling air supply plenum 1204 from the remainder of the compressed air plenum 514, which can be at a much higher temperature during combustor 104 operations. The cooling air in the cooling air supply plenum 1204 then flows through a passage 1208, and past the foil journal bearings 122a, 122b (only one shown in FIG. 12) and the foil thrust bearing 122c, as is shown using flow arrows 1210 and 1212, respectively. The cooling air 1210 that flows past the foil journal bearings 122a, 122b is discharged into the combustion chamber 1114, and the cooling air 1212 that flows past the foil thrust bearing 122c discharges back into the compressor discharge.

Figure 13:
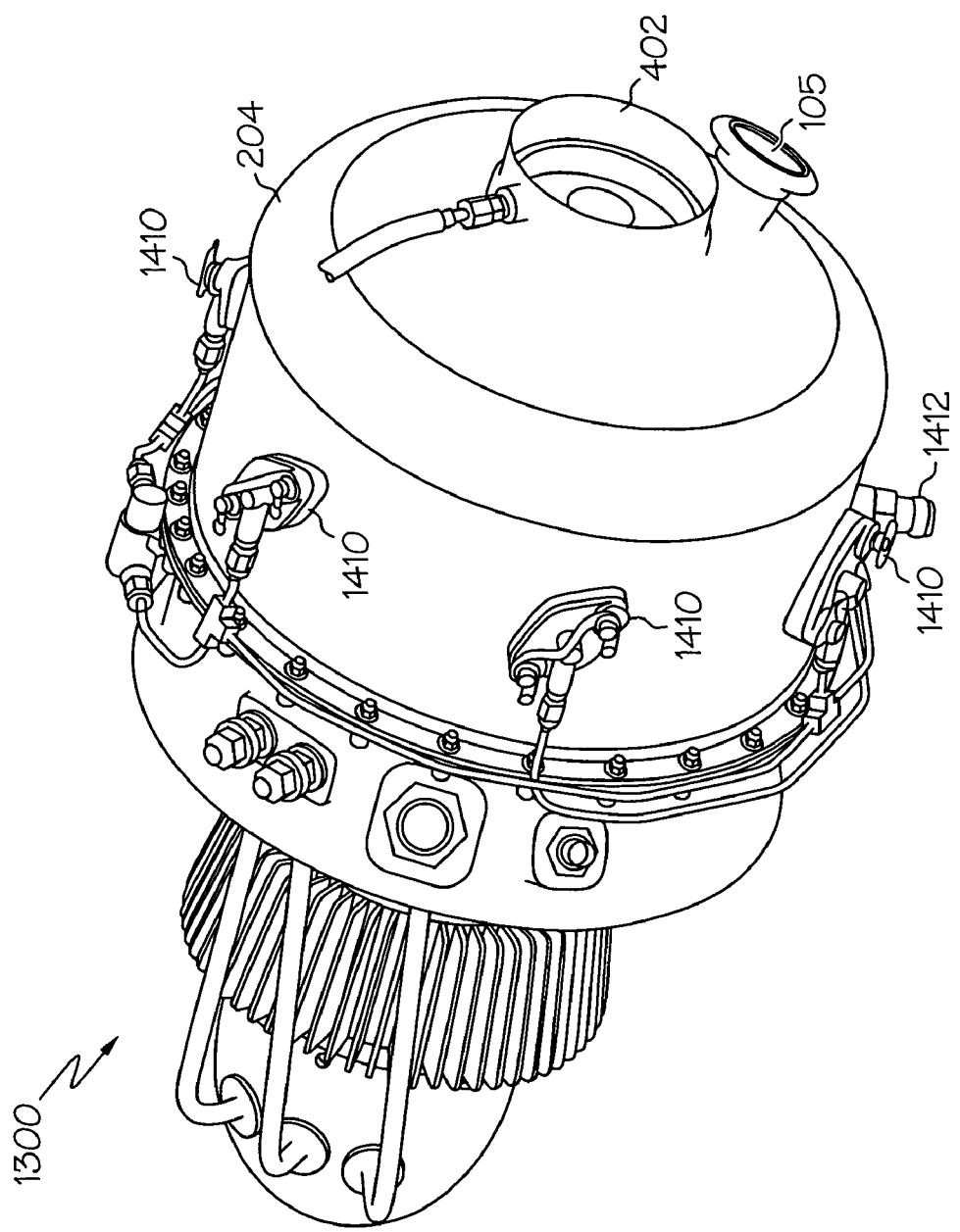
FIG. 13 is a perspective view of a physical implementation of the APU of FIG. 1, according to a third embodiment.
Figure 14:
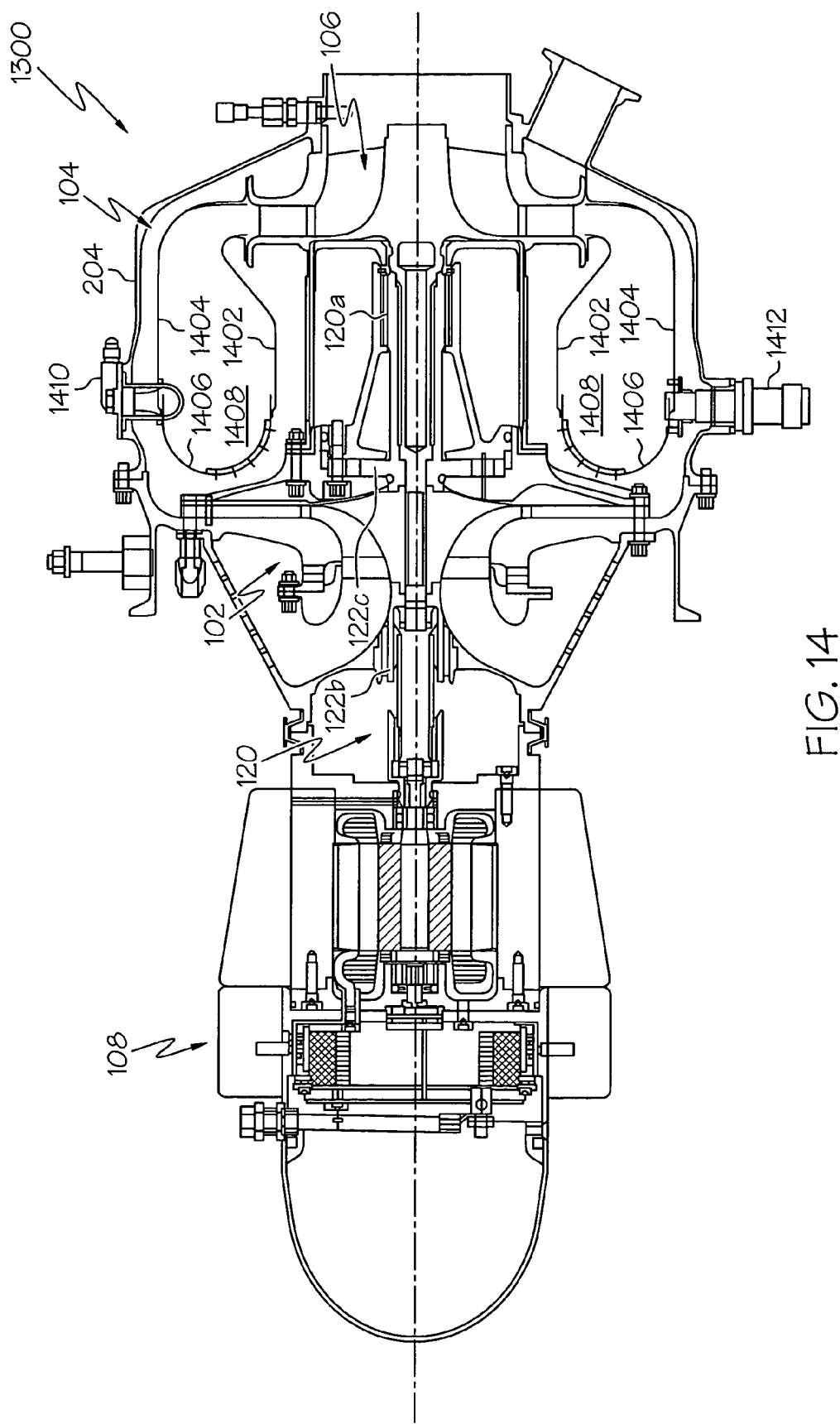
FIG. 14 is a cross section view of the exemplary APU shown in FIG. 13.

Turning now to FIGS. 13 and 14, a third embodiment of an APU 1300 is shown. The APU 1300 in this third embodiment is configured similar to the second embodiment described above, in that it includes the compressor 102, the turbine 106, the starter-generator unit 108, the containment housing 110 (only partially shown), the quill shaft assembly 120, the foil bearings 122, and variants thereof that were previously described. Moreover, the APU 1300 is configured with the internal foil bearing cooling supply arrangement of the previous APU 900, and thus does not include the heat exchanger 112. Once again, the only difference between this third embodiment and the previous embodiments is the combustor 104, which will now be described in more detail.

With reference to FIG. 14, it is seen that the combustor 104 in this third APU 1300 is an inline annular combustor that includes an inner annular liner 1402, an outer annular liner 1404, and a combustor dome 1406 that together form a combustion chamber 1408. A plurality of fuel injectors 1410 extend through the containment housing outlet section 204 (see FIG. 13) and into the combustion chamber 1408, and one or more igniters 1412 extend through the containment housing outlet section 204 and into the combustion chamber 1408.

The APU 100 described herein is implemented without gears between the turbine 106 and either the compressor 102 or starter-generator unit 108. The turbine 106 and starter-generator 108 are coupled to one another via the quill shaft assembly 120, which can be included without relying on extensive design or high manufacturing tolerances. The compressor 102 and turbine 106 are single-stage devices, and the bearings 122 and 510 do not rely on a flow of lubricant, even at rotational speeds of up to 100,000 r.p.m. As a result, the APU 100 is an integrated unit that is relatively small and lightweight. For example, the installation envelope for the APU 100 is about 20×12×12 inches, and the weight of the APU 100 is about 50–60 pounds.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An auxiliary power unit, comprising:
a combustor;
a turbine having an output shaft, the turbine in fluid communication with at least a portion of the combustor;
a compressor coupled to the turbine output shaft;
a starter-generator unit having at least a rotor mounted on a rotor shaft; and
a quill shaft assembly directly coupled between the turbine output shaft and the starter-generator unit rotor shaft, the quill shaft assembly comprising:
a hollow quill shaft having at least a first end, a second end, an inner surface, and an outer surface, the hollow quill shaft surrounding at least portions of the turbine output shaft and the starter-generator unit rotor shaft,
a first set of splines formed on the quill shaft outer surface at least proximate the quill shaft first end,
a second set of splines formed on the quill shaft outer surface at least proximate the quill shaft second end,
a turbine shaft coupling coupled to, and surrounding a portion of, the turbine output shaft, the turbine shaft coupling including at least a first end, a second end, and an inner surface,
a third set of splines formed on the turbine shaft coupling inner surface and engaging the first set of splines,
a rotor shaft coupling coupled to, and surrounding at least a portion of, the starter-generator unit rotor shaft, the rotor shaft coupling including at least a first end, a second end, and an inner surface, and
a fourth set of splines formed on the rotor shaft coupling inner surface and engaging the second set of splines.

2. The auxiliary power unit of claim 1, wherein the quill shaft assembly is configured to break down upon application thereto of a predetermined torque magnitude.

3. The auxiliary power unit of claim 1, wherein the combustor comprises and annular combustor.

4. The auxiliary power unit of claim 3, wherein the annular combustor is either an inline annular combustor or a radial annular combustor.

5. The auxiliary power unit of claim 1, wherein the combustor comprises a slinger combustor.

6. The auxiliary power unit of claim 1, further comprising: one or more foil bearings coupled to, and configured to rotationally support, the turbine output shaft.

7. The auxiliary power unit of claim 6, further comprising: one or more foil bearings coupled to, and configured to rotationally support, at least a portion of the quill shaft assembly.

8. The auxiliary power unit of claim 6, further comprising: one or more ceramic bearing assemblies coupled to, and configured to rotationally support, at least the starter-generator unit rotor.

9. The auxiliary power unit of claim 6, wherein:
the compressor includes at least an air inlet and a compressed air outlet; and
the one or more foil bearings are in fluid communication with the compressed air outlet.

10. The auxiliary power unit of claim 9, further comprising:
one or more conduits disposed upstream of the compressor air inlet and surrounding at least the turbine output shaft, the one or more conduits having at least an air inlet port and an air outlet port, the air inlet port in fluid communication with the compressed air outlet, and the air outlet port in fluid communication with the one or more foil bearings, whereby air that flows into the compressor air inlet cools air that flows in the one or more conduits and that is supplied to the one or more foil bearings.

11. The auxiliary power unit of claim 1, wherein the starter-generator unit comprises:
a starter-generator housing;
a motor/generator rotationally supported within the starter-generator housing, the motor/generator having at least a rotor that is coupled to the turbine output shaft, the motor/generator configured to selectively operate in either (i) a motor mode, whereby electrical energy is converted to rotational energy and supplied to the turbine output shaft, or (ii) a generator mode, whereby rotational energy is received from the turbine output shaft and converted to electrical energy; and
a control unit mounted within the starter-generator housing, the control unit electrically coupled to the motor/generator and operable to selectively configure the motor/generator to operate in either the motor mode or the generator mode.

12. The auxiliary power unit of claim 1, further comprising:
a containment housing that encloses therein at least the combustor, the turbine, the compressor, the starter-generator unit, and the quill shaft assembly.

13. The auxiliary power unit of claim 12, wherein the containment housing comprises:
an inlet section that encloses at least the starter generator unit and the quill shaft assembly therein; and
an outlet section coupled to the inlet section, the outlet section enclosing at least the combustor, the turbine, and the compressor therein.

14. The auxiliary power unit of claim 13, wherein:
the compressor includes an air inlet and a compressed air outlet;
the containment housing outlet section includes a compressed air plenum and an outlet port, the compressed air plenum in fluid communication with the compressed air outlet, and the outlet port configured to supply compressed air from the compressed air plenum to a bleed air supply system.

15. The auxiliary power unit of claim 1, wherein the turbine is a vaneless turbine.

16. The auxiliary power unit of claim 1, wherein:
the starter-generator unit comprises a motor/generator; and
the motor/generator is configured as a radial gap motor/generator.

17. The auxiliary power unit of claim 1, wherein:
the starter-generator unit comprises a motor/generator; and
the motor/generator is configured as an axial gap motor/generator.

18. An auxiliary power unit, comprising:
a compressor having an air inlet and a compressed air outlet;
a turbine;
one or more foil bearings coupled to, and configured to rotationally support, the turbine, the one or more foil bearings in fluid communication with the compressed air outlet, to thereby receive a flow of cooling air therefrom, and
one or more circumferentially directed heat exchanger conduits disposed upstream of the compressor air inlet and encircling at least the turbine output shaft, the one or more conduits having at least an air inlet port and an air outlet port, the air inlet port in fluid communication with the compressed air outlet, and the air outlet port in fluid communication with the one or more foil bearings, whereby air that flows into the compressor air inlet cools air that flows in the one or more circumferentially directed heat exchanger conduits and that is supplied to the one or more foil bearings.

19. The auxiliary power unit of claim 18, wherein the turbine includes an output shaft, and wherein the auxiliary power unit further comprises:
   a starter-generator unit having at least a rotor; and
   a quill shaft assembly coupled between the turbine output shaft and the starter-generator unit rotor.

20. The auxiliary power unit of claim 19, further comprising:
   one or more foil bearings coupled to, and configured to rotationally support, at least a portion of the quill shaft assembly.

21. The auxiliary power Unit of claim 20, further comprising:
   one or more ceramic bearing assemblies coupled to, and configured to rotationally support, at least the starter-generator unit rotor.

22. The auxiliary power unit of claim 19, wherein the quill shaft assembly comprises:
   a quill shaft;
   a turbine shaft coupling coupled to the turbine output shaft and engaging a first portion of the quill shaft; and
   a rotor shaft coupling coupled to the starter-generator unit rotor and engaging a second portion of the quill shaft.

23. The auxiliary power unit of claim 22, further comprising:
   a first plurality of splines on an outer surface of the quill shaft;
   a second plurality of splines on an inner surface of the turbine shaft coupling, the second plurality of splines engaging at least a portion of the first plurality of splines; and
   a third plurality of splines on an inner surface of the rotor shaft coupling, the third plurality of splines engaging at least a portion of the first plurality of splines.

24. The auxiliary power unit of claim 23, wherein the first plurality of splines includes a first portion and a second portion, the first portion disposed proximate a first end of the quill shaft, and the second portion disposed proximate a second end of the quill shaft.

25. The auxiliary power unit of claim 19, wherein the quill shaft assembly is configured to break down upon application thereto of a predetermined torque magnitude.

26. The auxiliary power unit of claim 18, wherein the starter-generator unit comprises:
   a starter-generator housing;
   a motor/generator rotationally supported within the starter-generator housing, the motor/generator having at least a rotor that is coupled to the turbine output shaft, the motor/generator configured to selectively operate in either (i) a motor mode, whereby electrical energy is converted to rotational energy and supplied to the turbine output shaft, or (ii) a generator mode, whereby rotational energy is received from the turbine output shaft and converted to electrical energy; and
   a control unit mounted within the starter-generator housing, the control unit electrically coupled to the motor/generator and operable to selectively configure the motor/generator to operate in either the motor mode or the generator mode.

27. The auxiliary power unit of claim 26, wherein: the starter-generator unit comprises a motor/generator; and the motor/generator is configured as a radial gap motor/generator.

28. The auxiliary power unit of claim 26, wherein:
   the starter-generator unit comprises a motor/generator; and
   the motor/generator is configured as an axial gap motor/generator.

29. The auxiliary power unit of claim 18, further comprising:
   a combustor in fluid communication with the turbine and compressed air outlet.

30. The auxiliary power unit of claim 29, wherein the combustor comprises a can-type combustor.

31. The auxiliary power unit of claim 18, further comprising:
   a combustor;
   a starter-generator unit;
   a quill shaft assembly; and
   a containment housing that encloses therein at least the combustor, the turbine, the compressor, the starter-generator unit, and the quill shaft assembly.

32. The auxiliary power unit of claim 31, wherein the containment housing comprises:
   an inlet section that encloses at least the starter generator unit and the quill shaft assembly therein; and
   an outlet section coupled to the inlet section, the outlet section enclosing at least the combustor, the turbine, and the compressor therein.

33. The auxiliary power unit of claim 32, wherein:
   the compressor includes an air inlet and a compressed air outlet;
   the containment housing outlet section includes a compressed air plenum and an outlet port, the compressed air plenum in fluid communication with the compressed air outlet, and the outlet port configured to supply compressed air from the compressed air plenum to a bleed air supply system.

34. The auxiliary power unit of claim 18, wherein the turbine is a vaneless turbine.

35. An auxiliary power unit, comprising:
   a containment housing;
   a compressor mounted within the containment housing and including at least an air inlet and a compressed air outlet;
   a turbine rotationally supported within the containment housing, the turbine having an output shaft; and
   one or more circumferentially directed heat exchanger conduits disposed within the containment housing upstream of the compressor air inlet, at least one of the one or more conduits encircling at least the turbine output shaft and having at least an air inlet port in fluid communication with the compressed air outlet, whereby heat is exchanged between air that flows into the compressor air inlet and air that flows in the one or more circumferentially directed heat exchanger conduits.

* * * * *

UNITED STATES PATENT AND TRADEMARK OFFICE
CERTIFICATE OF CORRECTION

| | | |
|---|---|---|
| PATENT NO. | : 7,251,942 B2 | Page 1 of 1 |
| APPLICATION NO. | : 10/880820 | |
| DATED | : August 7, 2007 | |
| INVENTOR(S) | : Kevin S. Dittmar et al. | |

It is certified that error appears in the above-identified patent and that said Letters Patent is hereby corrected as shown below:

Column 13, line 42, "and" should be changed to --an--.

Signed and Sealed this

Eleventh Day of December, 2007

JON W. DUDAS
*Director of the United States Patent and Trademark Office*